May 18, 1965 S. E. PENNER ET AL 3,184,515
OXYCHLORINATION PROCESS
Filed Feb. 1, 1962
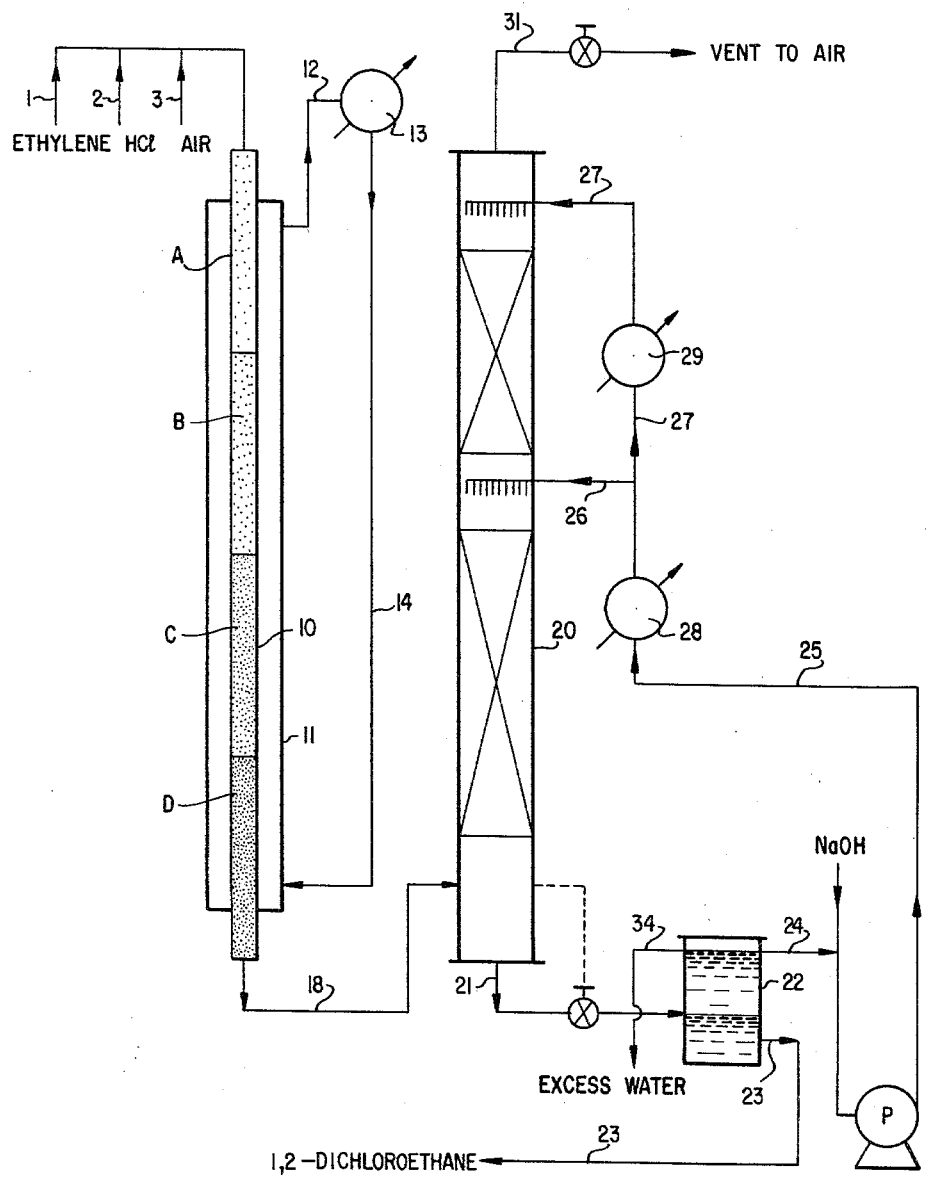
INVENTORS.
SIEGFRIED E. PENNER
ELBERT M. DE FOREST
BY Burns, Doane, Benedict, Swecker, & Mathis
ATTORNEYS.

United States Patent Office 3,184,515
Patented May 18, 1965

3,184,515
OXYCHLORINATION PROCESS
Siegfried E. Penner and Elbert M. De Forest, Wichita, Kans., assignors to Frontier Chemical Company, Division of Vulcan Materials Company, Wichita, Kans., a corporation of New Jersey
Filed Feb. 1, 1962, Ser. No. 170,399
12 Claims. (Cl. 260—658)

This invention relates to the oxychlorination of hydrocarbons and halogen-substituted hydrocarbons. It is more particularly concerned with an improvement in carrying out the oxychlorination under conditions adapted to improve process control, reactor capacity, and selectivity of the reaction.

It is well known that hydrocarbons such as ethylene can be chlorinated by passing them together with hydrogen chloride and air or other form of elemental oxygen over a catalyst comprising a metal having a variable valence, such as copper. For instance, the catalyst may be cupric chloride deposited on a porous inert solid such as pumice, activated alumina or diatomaceous earth. Of course, the copper chloride catalyst may be initially deposited on the support as cuprous chloride or cupric oxychloride rather than as cupric chloride since either of the two first mentioned chlorides is promptly converted to cupric chloride when exposed to air or oxygen and hydrogen chloride at elevated temperatures.

The principal reaction involved in the oxychlorination of ethylene can be represented by the following equation

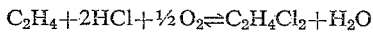

$$C_2H_4 + 2HCl + \tfrac{1}{2}O_2 \rightleftharpoons C_2H_4Cl_2 + H_2O$$

Since the process is highly exothermic, temperature control is most important. For this reason, an externally cooled tubular reactor has sometimes been used in the prior art. It has also been heretofore proposed to moderate the reaction by intermingling the supported cupric chloride catalyst with particles of inert solid diluent such as silicon carbide and to dispose the catalyst in the tubular reactor in a plurality of zones containing increasing concentrations of the active catalytic ingredient.

It is an object of the present invention to provide an improved process for oxychlorinating hydrocarbons and halogen-substituted hydrocarbons in vapor phase over a fixed bed of supported copper chloride catalyst such that substantially even temperature is maintained throughout the reaction zone. Another object is to provide an oxychlorination process wherein the feed materials are effectively converted at nearly stoichiometric feed ratios. Another object is to provide an oxychlorination process capable of operation at elevated pressures with effective temperature control. Still another object is to simplify product recovery by operating such that the concentration of inert gases in the reactor effluent is kept to a minimum and by allowing condensation of the desired product such as 1,2-dichloroethane at a relatively high temperature. These and other objects as well as the nature and operation of the invention will become more clearly apparent from the following description and attached drawing.

The drawing diagrammatically illustrates suitable equipment for carrying out the process of the invention and indicates the flow of materials therethrough.

The invention is applicable to the oxychlorination of ethylenically unsaturated aliphatic hydrocarbons of 2 to 4 carbon atoms per molecule. As used herein, the term "hydrocarbon" shall be understood to include also 1 to 2 halogen substituents such as chlorine, bromine or fluorine. Ethylene is accordingly an outstanding example of a suitable feed material. Other suitable feed materials are propylene, the normal butenes, as well as halogenated compounds such as vinyl chloride, vinylidene chloride, vinyl fluoride, allyl chloride, allyl bromide, etc.

According to the present invention, a major and surprising improvement in the oxychlorination of compounds such as ethylene is provided by carrying out the reaction in externally cooled tubular reactors having an internal diameter substantially smaller than two inches and containing a fixed bed of supported copper chloride catalyst particles which are intimately mixed with a substantial proportion of diluent particles, especially graphite, preferably while maintaining superatmospheric pressure in the reactor.

In order to moderate the reaction satisfactorily, it is desirable to use a catalyst mixture containing at least 50 volume percent of inert diluent particles intermingled with the catalyst particles, e.g., 50 to 95 volume percent of diluent and correspondingly 50 to 5 volume percent of catalyst bearing particles, in that portion of the reactor space which is nearest to the feed inlet end. However, it is usually desirable to decrease the concentration of the diluent particles gradually or in one or more steps toward the outlet end, e.g., from 60 volume percent or more of the diluent particles near the inlet end to 60 volume percent or more of the catalyst bearing particles near the outlet end, inasmuch as the oxychlorination reaction becomes progressively less vigorous in the direction of flow of the reaction mixture. Accordingly, the last portion of the catalyst bed can often advantageously be composed of active catalyst particles only, without any diluent. The optimum gradation of diluent particle concentration in the catalyst bed is such that a substantially uniform temperature without excessive hot spots is maintained throughout the entire reaction zone and will vary from case to case depending on size of the reactor, feed composition and feed rate, reaction pressure, the effectiveness of external cooling, etc. The optimum mutual adjustment of these several variables can, of course, be readily established according to well known engineering principles and by routine preliminary trial runs.

The copper chloride catalyst particles are prepared in a known manner, for example by impregnating particles of the catalyst bases with a solution of the copper salt and then drying. The particles of inert diluent are physically admixed with the catalyst particles to form a more or less even distribution of the two. Of course, several such mixtures of different catalyst/diluent ratios are made up where it is desired to have a concentration gradient of the diluent in the catalyst bed. Alternately, a similar effect can be achieved by using mixtures having the same ratio of catalyst particles to diluent particles throughout the bed but employing in such mixtures catalyst particles bearing copper in increasing concentration in the successive zones.

The catalyst particles themselves may contain about 1 to 20 weight percent of $CuCl_2$ deposited on a conventional support such as activated F–1 alumina. This is a well-known commercial granular desiccant manufactured by the thermal treatment of rock-like granules of alpha alumina trihydrate. Typical properties of such an activated alumina are as follows: $Al_2O_3$, 92%; $Na_2O$, 0.80%; $Fe_2O_3$, 0.12%; $SiO_2$, 0.09%; $TiO_2$, 0.01%; loss on ignition (1100° C.) 6.8%; surface area 2.10 sq. meter/g.; bulk density 50-55 lb./cu. ft.; specific gravity 3.3; crushing strength 55 (Alcoa method). It is a specially prepared, hard, stony, crystalline, non-friable, partially hydrated form of aluminum trioxide designated as "activated" alumina because of its active adsorptive properties. However, other conventional solid inorganic catalyst supports or even porous activated carbon such as "Columbia CXC" carbon, can also be used. Of course, carbon supports will undergo a little burning during the oxychlorination but this is not extensive when air is present in admixture with hydrogen chloride and ethylene or the like.

The average particle size of the inert support is chosen in the usual manner to allow free passage of the reactant gases while providing a large contact area. Commonly, the particles are of a size to pass a 4 mesh screen and to rest on a 8 mesh screen (U.S. Sieve Series), though other sizes may be used. The diluent particles mixed with the catalyst are conveniently chosen of a size comparable with that of the average catalyst particles, though finer particles may be used so long as they do not materially hinder the flow of gases through the reactor.

Various inert diluents of suitable thermal conductivity can be mixed with the supported copper catalyst particles. The thermal conductivity of the solid of which the diluent particles are composed is desirably at least about 8 B.t.u./hr./sq. ft./° F./ft. at 500° F. Accordingly, silicon carbide or small balls of suitable corrosion resistant metals such as Monel, nickel, stainless steel, tantalum, or copper itself, are examples of materials of which the diluent particles can be desirably made up. However, graphite has been found to be a surprisingly superior diluent for the purposes of this invention and is therefore preferred. While it does not appear that graphite in and of itself has any catalytic activity, and hence may be considered inert, nevertheless improved results are obtained with catalyst mixtures containing it, as compared with mixtures of catalyst particles diluted with other so-called inert diluents.

Suitable graphite particles may be derived from naturally occurring graphite or they may be derived from artificially graphitized carbon, e.g., fragments of coke or metallurgical carbon electrodes that have been baked at graphitizing temperatures in the range from about 4500° to 6500° F. in an otherwise well known manner. A preferred method of preparing the graphite particles is by mixing calcined coke, preferably petroleum coke, with a binder such as coal tar pitch. The mixture is extruded or molded and then baked to remove volatile components and coke the binder, and is finally graphitized. The particles can be formed prior to baking, or larger graphitized bodies may be crushed to the desired particle size. Comminuted scrap from graphite electrode manufacture may be used.

The reactor is desirably in the form of a narrow tube or bundle of tubes and made of corrosion resistant materials heretofore used in the art, e.g., Monel, nickel, stainless steel, Inconel, tantalum, and the like. Moreover, one of the essential features of this invention is that the reactor should have a relatively large ratio of external heat exchange surface to reactor volume, i.e., ratios of between about 35 to 70 sq. ft. of reactor surface per cubic foot of reactor volume. Thus, tubes about 0.75 to 1.25 inches in internal diameter have been found greatly superior to tubes having a substantially larger diameter such as 2 inches or more. Of course, instead of obtaining the desired high surface to volume ratio by the use of tubular reactors, other geometric arrangements such as annular reactors capable of transferring heat to the surrounding coolant through the inner as well as the outer wall are similarly useful as long as they fall within the critical range of surface/volume ratios set forth above. Where a large throughput is required, a bundle of tubes in a single shell can be used. The desired temperature control can be conveniently maintained by use of a cooling jacket surrounding the catalyst tube or bundle of tubes and circulating a liquid heat exchange medium such as biphenyl at a suitable rate and temperature through the jacket. Reactor tubes having a diameter substantially greater than that specified above give noticeably inferior results, particularly when operating at superatmospheric pressure in accordance with the preferred embodiment of the invention.

Superatmospheric operating pressures, e.g., pressures from about 25 to 150 pounds per square inch gauge, preferably 50 to 100 p.s.i.g., have been advantageously employed when using a diluted catalyst in accordance with the teachings hereof. In contrast, inadequate temperature control and the attendant occurrence of excessive "hot spots" in the reactor have made similar high pressure operations impractical when following the teachings of the prior art. The high pressure operation made possible in the system of the present invention has an important beneficial effect on lengthening catalyst life by reducing the partial pressure of the copper chloride in the gas phase and hence reducing its migration out of the catalyst bed. In addition, increased pressure permits increased throughputs through equal reactor volumes and also, importantly facilitates product recovery as further explained hereinbelow.

The reaction temperatures can be maintained between about 450 and 700° or 750° F., preferably maintaining a substantial proportion of the reaction space between about 500 and 600° F. The reaction rates become quite slow at temperatures below 450° F. whereas undesired side reactions and loss of copper chloride due to volatilization become increasingly apparent at temperatures above 700° F. For instance, in comparative runs, it has been found that conversion of ethylene to carbon dioxide increases from 0.4% at an average temperature of about 535° F. to 0.8% at 580° F. and to 1.7% at 670° F. The conversion of ethylene to the primarily desired 1,2-dichloroethane product has been found to decrease correspondingly from 98.7% at 535° F. to 97.9% at 580° F. and to 97.3% at 670° F.

EXAMPLE 1

An example illustrating the practice of the present invention will now be described with reference to the attached drawing. In the drawing, a vertically disposed Monel tube 10 is employed as the reactor. This tube has an outside diameter of 1 inch and is 20 feet long. Tube 10 is surrounded by a heat exchange jacket 11 through which biphenyl is circulated at a temperature of about 435° F. This temperature of the cooling medium is maintained by circulating the latter through line 12, water-cooled heat exchanger 13 and return line 14. Catalyst is packed in the reaction tube in several distinct zones A, B, C, and D. Using a catalyst composition composed of 8.5% $CuCl_2$ supported on 4-8 mesh, grade F-1 commercial activated alumina, the first or top zone contains 7 volume percent of such catalyst particles physically intermingled with 93 volume percent of graphite diluent particles. The second zone contains 15% catalyst and 85% graphite. The third zone contains 40% catalyst and 60% diluent and the fourth or bottom zone 100% catalyst particles. Of course, other diluent ratios and a greater or smaller number of zones of different catalyst concentrations can be used, the main consideration being that the reaction zone should desirably be maintained throughout at temperatures below about 700° F.

Ethylene, hydrogen chloride and air are fed into the system through inlet pipes 1, 2, 3, respectively. They are introduced into reactor 10 at 80° F. and at a pressure of 70 p.s.i.g. in substantially stoichiometric proportions, i.e., preferably not more than 10% excess of any one reagent is used with relation to the others based on the equation shown on the first page of this specification. The relative rates of the reagents actually fed in this example are as follows:

|  | Parts by weight per hour |
|---|---|
| Ethylene | 12.3 |
| HCl | 32.6 |
| Air | 30.6 |

When steady state conditions are reached, the temperature in the reactor is about 440° F. at the top of the tube, rises toward about 520° F. in the middle zones of the tube and then gradually drops off again to about 440° F. toward the bottom of the tube. The product is withdrawn from the reactor via line 18 and passed to recovery tower 20 where the reaction products are cooled by direct contact with cooling water, condensed and recovered. Liquid condensate is withdrawn from the bottom of tower 20 via line 21 and passed to a liquid separator 22 where the principal reaction product (1,2-dichloroethane) is separated from water. The dichloroethane layer is withdrawn via line 23 to a conventional purification unit (not shown) for further processing. The aqueous layer is withdrawn from separator 22 via line 24 and after addition of a small amount of sodium hydroxide solution is recirculated to the cooling tower via lines 25, 26, and 27. Excess water is discarded via line 34. The circulating aqueous liquid is cooled to about 100° F. by passing through a water-cooled heat exchanger 28 before being sprayed into tower 20 via line 26. The remaining aqueous liquid is refrigerated to about 30° F. in refrigeration unit 29 before being returned to the top of tower 20 via line 27. Nitrogen and other uncondensed gases are vented to the atmosphere from the top of tower 20 via line 31.

Under the conditions described ethylene conversion of 97% and HCl conversion of 98% are obtained and the chlorination product has the following distribution:

|  | Mole percent |
|---|---|
| 1,2-dichloroethane | 96.0 |
| Ethyl chloride | 3.2 |
| Trichloroethylene | 0.4 |
| 1,1,2-trichloroethane | 0.3 |
| Other chloroethanes | 0.1 |

It will be noted that the process of the invention gives a 93% yield of 1,2-dichloroethane with small amounts of ethyl chloride and less than 1% of the less desired heavier chloroethanes. By contrast, related prior art processes such as that described in U.S. Patent 2,866,830 have tended to produce significantly lower yields of 1,2-dichloroethane and 5% or more of the heavier chloroethanes.

It should be noted that graphite dilution has allowed operating the process at elevated pressure while retaining effective temperature control. The pressure operation has proven to be unusually advantageous in resulting in good conversions with nearly stoichiometric feed ratios. 97% conversions of both ethylene and HCl have been obtained in the process of the invention with not more than 5% excess above theoretical of any one of the three feed components. More broadly the present process is readily operable using not more than about 50%, preferably less than 15%, excess oxygen and not more than 10% excess HCl relative to ethylene feed. By contrast, related prior art processes such as that described in U.S. Patent 2,866,830 have typically used over 10% excess HCl and over 60% excess oxygen. Such excess wastes reagents and greatly increases the difficulty in condensing organic products from large volumes of inert gases.

The superatmospheric pressure operation of this invention has the further advantage that it reduces the partial vapor pressure of 1,2-dichloroethane in the reactor effluent gases and makes condensation of the dichloroethane possible at much higher temperatures than when the oxychlorination process is carried out at substantially atmospheric pressures in accordance with previously customary practice. As illustrated in this example, 1,2-dichloroethane is almost totally recovered in the simple one-step condensation system represented by tower 20 at temperatures above the freezing point of the liquids. By contrast, atmospheric pressure operation of the reactor usually requires drying of the reactor effluent gases, compression, and then condensation at reduced temperatures. Investments for the latter type of operation are from 30 to 50% more than for the pressure operation of this invention.

EXAMPLE 2

In this example similar equipment as that described in Example 1 is used except that the single tube reactor is replaced by a bundle of ten Monel tubes 21 feet long and 1 inch in diameter. The catalyst is F–1 activated alumina containing 8.07 weight percent $CuCl_2$ deposited thereon. Particle size is again −4 to +8 mesh and graphite particles are again used as diluent in decreasing concentration between reactor inlet and outlet as shown by the data presented below.

*Catalyst zoning*

| Zone | Distance from top of tube to top of zone, ft. | Zone depth, ft. | Catalyst conc., vol. percent | Graphite conc., vol. percent |
|---|---|---|---|---|
| 1 | 0 | 0.5 | 0 | 100 |
| 2 | 0.5 | 6.0 | 11 | 89 |
| 3 | 6.5 | 5.0 | 18 | 82 |
| 4 | 11.5 | 5.0 | 40 | 60 |
| 5 | 16.5 | 4.0 | 100 | 0 |
| 6 | 20.5 | 0.5 | 0 | 100 |

| | | |
|---|---|---|
| Duration of run | hours | 330 |
| Total HCl fed | pounds | 9956 |
| Total $C_2H_4$ fed | do | 3625 |
| Total air fed | do | 10,185 |
| Total chlorinated products | do | 12,500 |
| Total 1,2-dichloroethane | do | 12,060 |
| Total ethylene conversion | percent | 99.0 |
| Ethylene conversion to chlorinated products | do | 97.7 |
| Ethylene conversion to 1,2-dichloroethane | do | 94.3 |
| Ethylene oxidized | do | 1.3 |
| Total HCl conversion | do | 92.9 |
| Excess oxygen | do | 14.0 |
| Sxcess HCl | do | 6.0 |
| Reactor temperatures | | |
| Maximum | ° F | 565 |
| Minimum | ° F | 450 |
| Biphenyl bath temperature | ° F | 433 |
| Reactor pressure | | |
| Inlet | p.s.i.g | 75 |
| Outlet | p.s.i.g | 67 |

*Typical effluent analysis*

| Component | HCl and $H_2O$ free basis, weight percent |
|---|---|
| Oxygen | 1.089 |
| Nitrogen | 37.695 |
| Ethylene | 0.092 |
| Vinyl chloride | 0.004 |
| Ethyl chloride | 0.922 |
| Vinylidene chloride | 0.017 |
| Trans-dichloroethylene | 0.013 |
| Cis-dichloroethylene | 0.028 |
| Chloroform | 0.008 |
| 1,2-dichloroethane | 58.493 |
| Chloral | 0.483 |
| 1,1,2-trichloroethane | 0.380 |
| Carbon monoxide | 0.403 |
| Carbon dioxide | 0.373 |

Excellent conversions of ethylene feed and remarkably high selectivities to the desired 1,2-dichloroethane are again noted.

EXAMPLE 3

The advantage of using a small diameter reactor is shown by the two runs below.

In the first run (Run 3), a 5-foot length of Monel tube having a 2-inch outside diameter was used as the reactor. It was charged with a 3.5-foot deep upper zone of a mixture comprising 80% graphite and 20% catalyst (13.8 weight percent $CuCl_2$ on F-1 alumina) and a 1.5-foot deep lower zone of a mixture comprising 50% graphite and 50% catalyst. It was externally heated in a standard manner using a biphenyl pressure of about 75 p.s.i.g. A temperature profile taken before introduction of feeds showed the temperature was 467° F. at the top of the reactor, 455° F. at the center and 445° F. at the bottom. Feed components were then introduced at the following rates:

Ethylene_____ 10.8 s.c.f.h. (limiting).
HCl_____ 21.6 s.c.f.h. (stoichiometric).
Air_____ 36 s.c.f.h. (40% excess).

The reactor temperature rapidly rose to above 800° F. and was still increasing when the run was shut down as a precautionary measure soon after start-up.

In contrast, in a similar run (Run 4) a 5-foot length of Monel tube having a 1-inch inside diameter was used as the reactor. It was packed with catalyst in exactly the same way and heated in the same way (temperatures before introduction of feeds were 467° F. at top, 456° F. at center and 449° F. at bottom) as in Run 3. In the course of Run 4, the temperature reached a maximum at 626° F. but most of the reaction took place at about 580° C. when the following feed rates were used:

Ethylene_____ 7.8 s.c.f.h. (limiting).
HCl_____ 17.2 s.c.f.h. (10% excess).
Air_____ 26.0 s.c.f.h. (40% excess).

The above runs are not exactly comparable since the feed rates for the 2-inch reactor were about 40% greater than in the 1-inch reactor. Obviously, however, there would be no incentive to go to a larger reactor if throughput could not thereby be increased. For comparison purposes, another run (Run 5) was made in the 2-inch reactor using the same feed rates as in the 1-inch reactor run (Run 4) and making special efforts to obtain a reasonable temperature in it for comparison. Thus, in Run 5, the catalyst bed was packed in five zones. From top to bottom the catalyst concentration was now 5.6%, 6.7%, 8.3%, 11.1% and 16.7%. A lower initial temperature was used: 443° F. at the top, 441° F. at the center, and 437° F. at the bottom. Feed rates were now exactly the same as those described in Run 4. The maximum temperature proved to be 673° F., 47° F. higher than in the 1-inch reactor, and definitely too high for optimum results. Thus, at the same feed rates, the 2-inch reactor with four times the cross-sectional area had a maximum temperature significantly higher than did the 1-inch reactor even though the 2-inch reactor had the benefit of a 15° F. lower bath temperature and had a five-zone catalyst bed instead of a two-zone bed. This demonstrates the great advantage of the 1-inch reactor over substantially larger ones where oxychlorination of organic compounds is to be carried out.

EXAMPLE 4

Using substantially the same reactor and catalyst bed as described in Example 1, two runs were made wherein vinyl chloride was employed as the feed to be oxychlorinated. Excellent yields of 1,1,2-trichloroethane were obtained, accompanied by useful amounts of 1,1-dichloroethane and cis-dichloroethylene. 1,1,2-trichloroethylene is a valuable raw material for the manufacture of vinylidene chloride to which the former is readily converted by reaction with caustic soda or lime. The reaction conditions and results of the two vinyl chloride oxychlorinations are summarized in the table below.

*Oxychlorination of vinyl chloride with HCl to 1,1,2-trichloroethane*

|  | Run number | |
|---|---|---|
|  | 6 | 7 |
| Feed rates: | | |
| HCl, s.c.f.h. | 14.3 | 11.1 |
| Vinyl chloride, s.c.f.h. | 6.5 | 5.0 |
| Air, s.c.f.h. | 18.6 | 15.1 |
| Avg. temperature of reactor, °F. | 440 | 425 |
| Reactor pressure, p.s.i.g. | 8 | 4 |
| Products of reaction, mol percent: | | |
| Vinylidene chloride | 0.04 | Trace |
| 1,1-dichloroethane | 5.33 | 7.15 |
| Cis-dichloroethylene | 16.74 | 16.86 |
| Trichloroethylene | 0.19 | 0.42 |
| 1,1,2-trichloroethane | 77.69 | 75.56 |
| HCl conversion to organic chlorides, percent | 86.7 | 56.3 |
| Vinyl chloride conversion to organic chlorides, percent | 96.4 | 62.4 |
| Superficial residence time in reactor, sec. | 4.9 | 1.4 |

It will be noted that the two runs gave quite similar results. However, it is apparent that the greater residence time employed in Run 6 had a beneficial effect on selectivity and especially on conversion. The halogenated hydrocarbon feeds generally require somewhat longer reaction times for optimum results than do the corresponding unsubstituted feeds. Optimum conditions are of course readily determined by routine preliminary tests.

Feed to this oxychlorination reaction can be either substantially pure vinyl chloride or various mixtures rich in vinyl chloride. For instance, conventional chlorination of ethane for the production of chloroethanes results in large amounts of vinyl chloride and hydrogen chloride gas in the reactor effluent in addition to the principally desired chloroethanes. By properly controlling condensation of such a reactor effluent, it is possible to obtain a gaseous mixture in satisfactory proportions of vinyl chloride and hydrogen chloride for feed directly, without further processing, to an oxychlorination process based on the present invention. This results in higher ultimate yields of valuable vinylidene chloride and greater utilization of chlorine in soluble products than are otherwise obtainable.

It is to be understood that the foregoing description and examples are merely given by way of illustration. Many variations may be made therein without departing from the scope or spirit of the invention as claimed herein.

We claim:

1. A process for oxychlorinating an unsaturated aliphatic compound selected from the group consisting of ethylenically unsaturated hydrocarbons containing 2 to 4 carbon atoms per molecule and their halogen substitution products containing 1 to 2 halogen atoms per molecule, which process comprises forming a feed mixture consisting essentially of said compound, hydrogen chloride and an oxidizing gas selected from the group consisting of air and oxygen, the amount of oxygen in said mixture being in greater than stoichiometric proportion but not greater than 50% excess relative to the unsaturated compound present, passing said feed mixture through a fixed bed of particles in a tubular reaction zone maintained at a pressure of at least 25 p.s.i.g. and having a ratio of external heat exchange surface to reaction volume of at least about 35 square feet per cubic foot, said fixed bed comprising a mixture of (a) a copper chloride catalyst supported on particles of a solid catalyst carrier and (b) particles of a solid inert diluent having a thermal conductivity of at least 8 B.t.u./hr./sq. ft./°F./ft., said mixture of particles containing at least 60 volume percent of diluent particles and correspondingly not more than 40 volume percent of catalyst bearing particles near the inlet end of said reaction zone and at least 60 volume percent of catalyst bearing particles and correspondingly not more than 40 volume percent of diluent particles near the outlet end of said reaction zone, thereby providing increased catalyst concentration in the direction of flow of the reactant gases, cooling said reaction zone by indirect heat exchange with a liquid heat exchange medium, and thus maintaining said catalyst particles throughout said fixed bed substantially evenly at temperatures within the range of from 450° to 700° F., and withdrawing gaseous products from said reaction zone.

2. In a process for making 1,2-dichloroethane by oxychlorination of ethylene as represented by the reaction $$C_2H_4 + 2HCl + 1/2O_2 \rightarrow C_2H_4Cl_2 + H_2O$$

the combination of steps which comprises forming a feed mixture consisting essentially of ethylene, hydrogen chloride and air and containing more than the stoichiometric amount but less than 15% excess oxygen and less than 10% excess HCl relative to the ethylene, passing said feed mixture through a fixed bed of particles in a tubular reaction zone having a ratio of external heat exchange surface to reaction volume of at least about 35 square feet per cubic foot, said fixed bed comprising a mixture of (a) a copper chloride catalyst supported on particles of a solid catalyst carrier and (b) particles of graphite, the concentration of the catalyst particles in said bed increasing progressively from not more than 40 volume percent at the front end of said bed to at least 60 volume percent near the rear end of said bed, thereby providing increased catalyst concentration in the direction of flow of the reactant gases, maintaining said reaction zone at a pressure between about 50 and 100 p.s.i.g., maintaining said catalyst particles throughout the fixed bed substantially evenly at temperatures within the range of from 450° to 700° F. by indirect heat exchange between said reaction zone and an external cooling zone which contains a liquid heat exchange medium, withdrawing gaseous products under pressure from said reaction zone, cooling and condensing the withdrawn products under pressure and at a temperature above the freezing point of water, separating water from liquid chlorinated products, and recovering 1,2-dichloroethane.

3. A process according to claim 1 wherein the hydrocarbon compound being oxychlorinated is vinyl chloride.

4. A process according to claim 1 wherein the reaction zone is a tubular zone having an internal diameter between 0.75 and 1.25 inch.

5. A process according to claim 1 wherein the hydrocarbon compound being oxychlorinated is ethylene and wherein the catalytic reaction zone is maintained at a temperature between about 450° and 600° F. and at a pressure between about 50 and 150 p.s.i.g.

6. A process according to claim 5 wherein the carrier for the copper chloride catalyst is activated alumina.

7. A process according to claim 5 wherein the oxidizing gas is air.

8. A process according to claim 5 wherein said diluent particles in the fixed bed are graphite.

9. A process according to claim 5 wherein said feed mixture contains less than 15% excess above theoretical of oxygen and not more than 10% excess above theoretical of HCl relative to the ethylene in the feed.

10. A process according to claim 5 which further comprises condensing said withdrawn gaseous products substantially at the said reaction pressure and at a temperature above the normal freezing temperature of the resulting water-containing condensate, and recovering 1,2-dichloroethane therefrom.

11. A process according to claim 5 wherein said fixed bed contains at least two consecutive zones of different catalyst concentration.

12. A process for making 1,2-dichloroethane by oxychlorination of ethylene which comprises forming a reactant gas mixture consisting essentially of ethylene, hydrogen chloride and air and containing less than 15% excess oxygen and not more than 10% excess HCl relative to the ethylene, passing said gas mixture at a reaction pressure between about 50 and 100 p.s.i.g. through a fixed bed of particles in a tubular reaction zone having a diameter of between 0.75 and 1.25 inches, said fixed bed being made up of a first and at least one subsequent section of graphite particles intermingled with catalyst particles of copper chloride supported on alumina to form a particle mixture therewith, the catalyst particles being present in said particle mixture in a concentration of not more than about 40 volume percent in said first section of said fixed bed and in a concentration of at least 60 volume percent in a subsequent section near the outlet end of said fixed bed, maintaining said reaction zone evenly at temperatures between about 450° and 600° F. by indirect heat exchange with a liquid cooling medium, withdrawing $HO_2$-containing gaseous products from said reaction zone, condensing said withdrawn products substantially at said reaction pressure and at a temperature above the normal freezing temperature of the water present in the resulting condensate, and recovering 1,2-dichloroethane from the condensate.

References Cited by the Examiner
UNITED STATES PATENTS

| | | | |
|---|---|---|---|
| 1,721,873 | 7/29 | Sper | 260—662 |
| 2,674,633 | 4/54 | Reitlinger | 260—659 |
| 2,838,577 | 6/58 | Cook et al. | 260—659 |
| 2,866,830 | 12/58 | Dunn et al. | 260—662 |
| 2,870,225 | 1/59 | Cooley et al. | 260—662 |
| 2,952,714 | 9/60 | Milam et al. | 260—659 |

FOREIGN PATENTS 517,009   9/55  Canada.

OTHER REFERENCES

Hougen et al., Chemical Process Principles, part 3, Kinetics and Catalysis, Wiley and Sons (New York, 1947 TP 155 H65), p. 1032.

LEON ZITVER, *Primary Examiner.*